April 9, 1968 A. SCHWARZKOPF 3,376,618
SNAP FASTENER
Filed Sept. 10, 1965 2 Sheets-Sheet 1
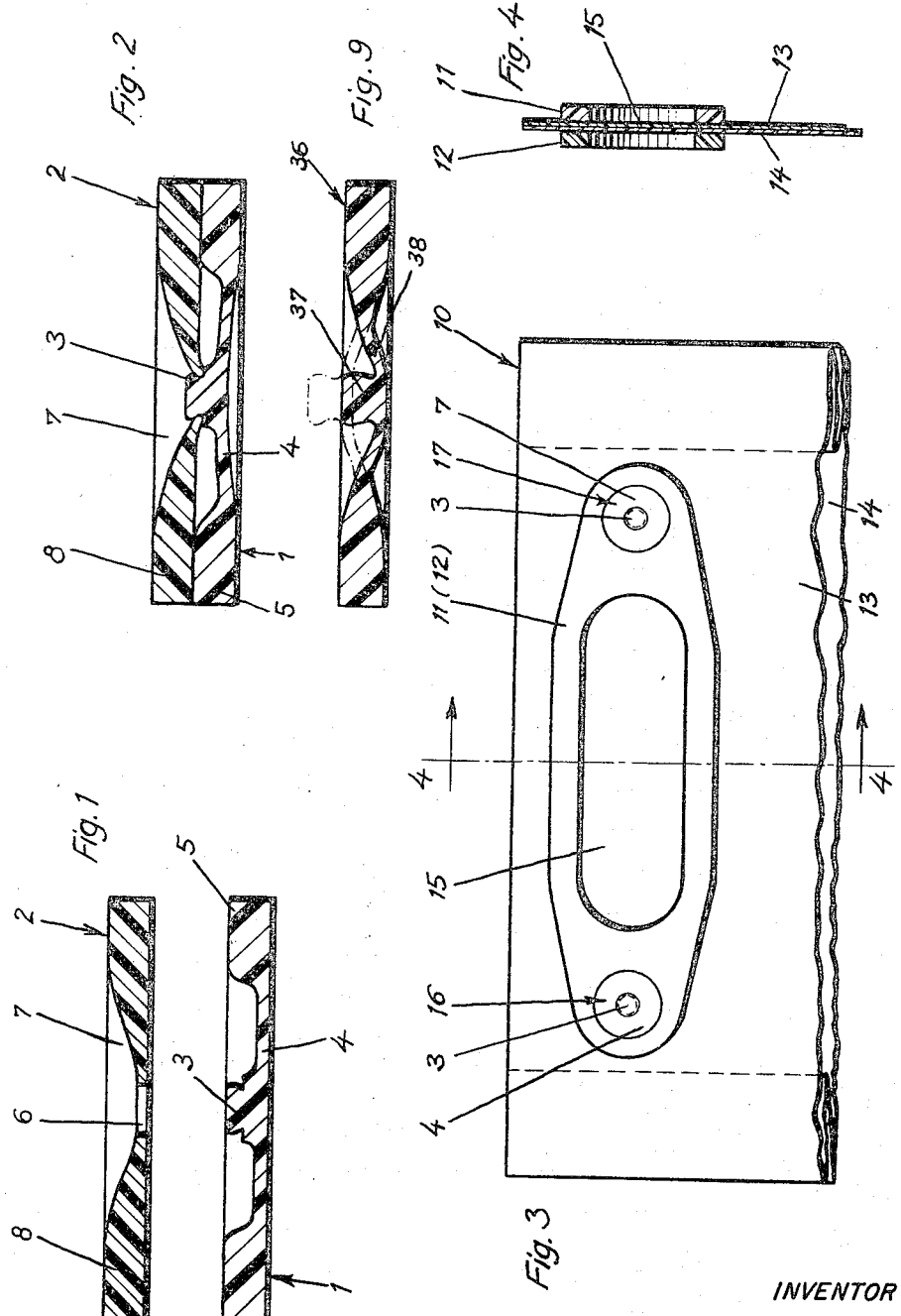
INVENTOR
August Schwarzkopf
BY Stevens, Davis, Miller & Mosher
ATTORNEYS April 9, 1968     A. SCHWARZKOPF     3,376,618
SNAP FASTENER
Filed Sept. 10, 1965     2 Sheets-Sheet 2
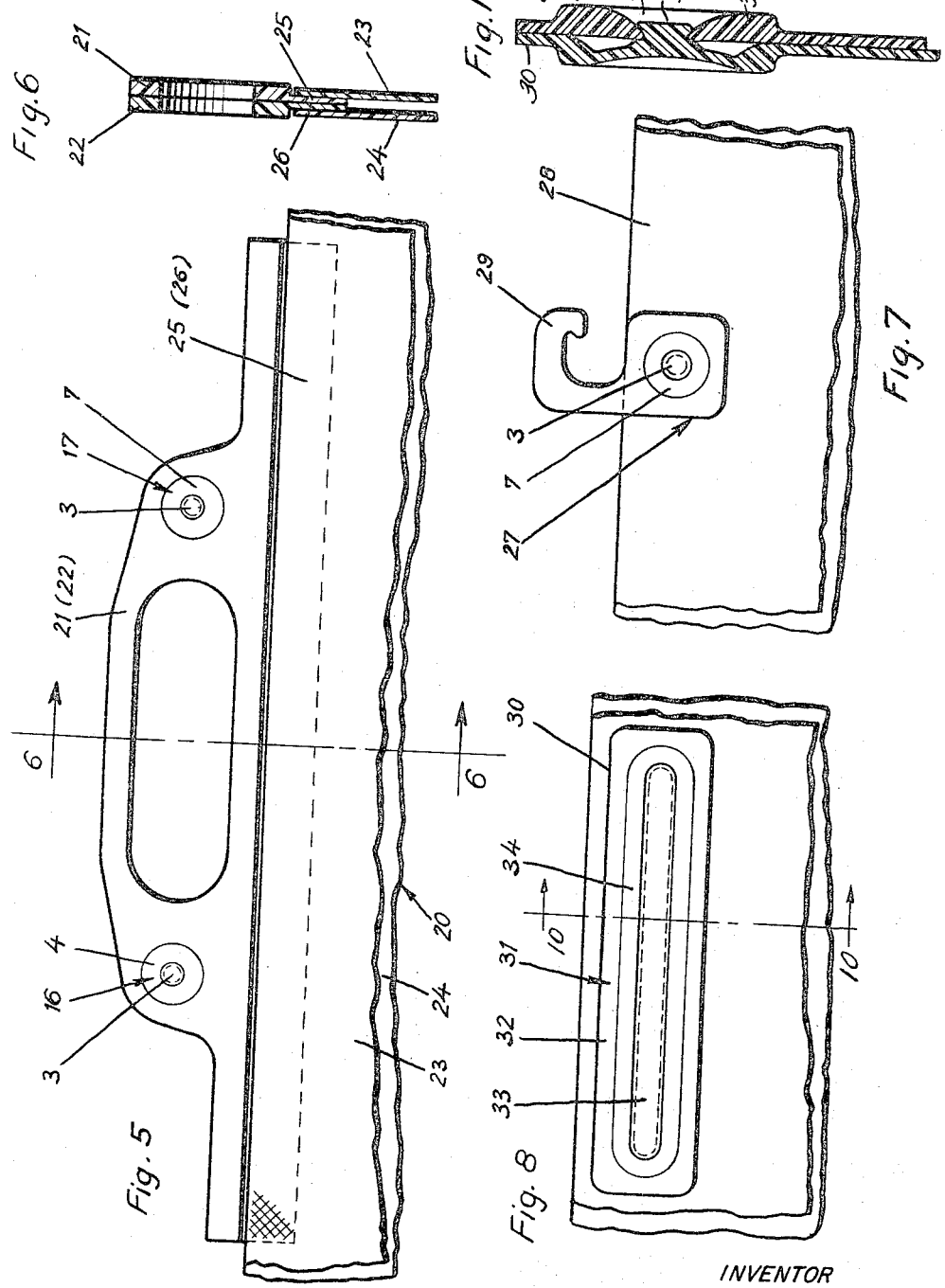
INVENTOR
August Schwarzkopf
BY Stevens, Davis, Miller & Mosher
ATTORNEYS United States Patent Office 3,376,618
Patented Apr. 9, 1968

3,376,618
SNAP FASTENER
August Schwarzkopf, Lengerich, Germany, assignor to Windmöller & Hölscher, Lengerich, Germany
Filed Sept. 10, 1965, Ser. No. 486,292
Claims priority, application Germany, Sept. 26, 1964, W 37,623
6 Claims. (Cl. 24—208)

ABSTRACT OF THE DISCLOSURE

The invention describes a snap fastener comprised of a flexible plastic material useful for a closure for plastic bags and similar articles. The snap fastener is comprised of two parts, a male and a female part, both of which are designed with all parts of the structure residing between a pair of parallel planes defining opposite faces of each part. The male part is constructed with a head portion centrally located, which is connected to the outer portion by means of a reduced section flexible diaphragm so that the head portion can be pushed up out of the plane of the male part. The female part is constructed of flexible material with a reduced central section and an opening corresponding in location to the head of the male part. Both parts lying between opposing planes defining their faces provides a snap fastener that can be loaded into magazines of a machine and processed automatically since they have the capability of being stacked.

---

The present invention relates to a snap fastener in which at least the head member thereof is constructed of a flexible plastic or rubber. The entire snap fastener of the invention can be preferably made of elastic thermoplastic material.

Snap fasteners in general have a head member and a socket member and have a large field use as connecting or fastening elements. In many cases, such as for clothes, tarpaulins, rain hoods, wallets, etc., snap fasteners consisting mainly of metal members have been and are still being used. Generally both the head and the socket members of the snap fasteners are round in shape. Snap fastener-like socket-pin connections and rabbet-groove connections have been used for some time in connection with pairs of handles of thermoplastic material attached to bags for containing merchandise therein. The head members of known snap fasteners are shaped in such a manner that the head portion protrudes with respect to the edge portion surrounding it so that the head portion can be pressed into the opening of the socket member.

If a snap fastener or a pair of snap fastener connected handles is to be used or if the two members are applied individually but not entirely by machine to two objects and are used to connect the same, it is not disadvantageous if the head protrudes with respect to the edge of the socket part.

However, the above is not true when two snap fastening members are to be attached individually in a process carried out completely by machine. In this case, the protrusion of the head portion with respect to the edge portion of the head member has a detrimental effect, since the individual members of the fastener can be combined only very poorly, if at all, to form piles or rolled tapes such as constitutes a prerequisite for automatic processing as well as for storage in suitable magazines of the processing machines. For this reason, up to the present time no suitable method or machines operating in accordance with such methods have found their way into actual practice.

The present invention thus has the object of creating a snap fastener, the two members of which can be individually processed completely by machine, without a protruding head portion making further working of the members difficult or impossible.

In order to accomplish the above purpose, the invention proposes, in the case of a snap fastener of the aforementioned type, to connect the head portion with the edge portion surrounding it by means of a diaphragmlike portion of considerably lesser thickness than the thickness of the edge portion and that it not be made higher than the edge portion. The diaphragm in the relaxed condition is arranged to hold the base of the head portion at a distance corresponding at least to the height of the head portion from the plane of the edge portion surface intended to rest against the socket member. The head portion before attachment to the socket member does not extend above the plane of the outer surface of the edge portion facing the socket member so that no protruding portion prevents the use of the head member, constructed in accordance with the invention, while the said members are stored in the magazines of processing machines.

It is a further object of the present invention to provide a snap fastener comprising a head member and a socket member which can rest against each other without being integrally connected to each other.

It is yet a further object of the present invention to provide a snap fastener in which it is necessary to press the head portion out of the region of the edge of the head member in order to engage with the opening of the socket member thereby connecting the two members integrally together.

Preferably not only the head member but also the socket member may be constructed of elastic material. In such a case, and resulting from the intrinsic elasticity of the two members, a resilient spring element in the socket member adapted to engage behind the head portion can be dispensed with and the socket member can be developed in an extremely simple manner.

Depending on the intended purpose or on the intended type of use, the snap fastener in accordance with the invention can be sewed, bonded or heat sealed onto an object or else can be produced directly with the object as an integral part thereof.

Furthermore and depending on the purpose or use of the snap fastener, the hole in the socket member may be round, elongated, or any other geometric shape as desired and accordingly the head portion of the head member may likewise have a corresponding, desirable geometrical shape.

The snap fastener of the invention may be used to particular advantage as the closure element for bags constructed of thermoplastic sheet, in which the fastener can be easily attached by heat sealing. In the case of bags having separate pairs of handles or with a special hook for the hanging thereof or grip or edge reinforcements, the snap fastener members may be formed as parts of the handles and hooks.

In another particularly advantageous embodiment of the invention, the diaphragm portion can be arched in the relaxed condition and the transition region from the edge portion to the diaphragm can be developed approximately symmetrical to a plane to which the axis—in the case of a round head—or the longitudinal central plane—in the case of an elongated head—of the head portion is perpendicular. By the curving or arching of the diaphragm portion and by the fact that the transition region from the edge portion to the diaphragm presses the latter neither downward nor upward, two different normal positions may be obtained for the head. In the lower position, it is located suitably for working entirely by machine by being in such a position that the head portion does not protrude above the upper surface of the edge portion.

In the other position or upper position, it reaches by simple upward pressure on the diaphragm, the head extends in the traditional manner considerably above the upper surface of the edge portion. This development not only has the advantage that, in the condition of use after the first fastening, the head portions in each case can easily be noted and accordingly easily introduced to the corresponding socket member, but also the particular advantage that no force tending to open the socket member is exerted on the closed snap-fastener connection.

The snap fastener of the invention as well as examples of the use of the snap fastener will be described in detail below with reference to the accompanying drawings in which:

FIG. 1 shows in central cross section, the two members of the snap fastener in the disconnected position;

FIG. 2 shows, in central cross section, the members of the snap fastener of FIG. 1 in the closed or connected position;

FIG. 3 shows the filling end of a bag having handle reinforcements therein with snap fasteners in accordance with the invention being attached to the handles;

FIG. 4 is a cross section along line IV—IV of FIG. 3;

FIG. 5 shows the filling end of a bag having a pair of handles extending therefrom with snap fasteners according to the invention provided in said handles;

FIG. 6 is a cross section along line VI—VI of FIG. 5;

FIG. 7 shows the filling end of a bag provided with a suspension hook at the opening end thereof with the hook being provided with a snap fastener according to the invention;

FIG. 8 shows a filling end of a bag with the bag being provided with a snap fastener according to the invention wherein the head and hole portions of the fastener are elongated in shape;

FIG. 9 illustrates in central cross section the head member of a snap fastener in accordance with the invention illustrating the two fixed positions of the head portion; and FIG. 10 is a section taken along line 10—10 of FIG. 8.

The snap fastener of the invention, illustrated in FIGS. 1 and 2, consists of a head member 1 and socket member 2. Both parts are made of a thermoplastic material which is very resilient without too small a thickness. The head portion 3 of the head member is connected via a diaphragm-like portion 4 to the fastening edge portion 5. In order to receive the head portion 3 and to effect the detachable fastening between the head member 1 and socket member 2, a hole or opening 6 is provided in the socket member 2. The hole is even with the side of the outer surface facing the head member and tapers outwardly to form a recess 7 in the other side of the socket member. The socket member also comprises a fastening edge 8. The head portion 3 and the opening 6 may have any desirable shape such as a circular shape. The diameter of the opening is smaller than the largest diameter of the head portion. The edge of the opening, however, is sufficiently elastic that the head portion can be readily forced therein. In the unfastened condition of the snap fastener, as illustrated in FIG. 1, the outer surface of the free end of the head portion 3 is flush with the outer surface of the edge portion 5 facing the socket member 2. The diaphragm-like portion 4 makes it possible, when the head member 1 and the socket member 1 rest against each other, to press the head portion 3 through the opening 6 thus closing and fastening the snap fastener to the condition illustrated in FIG. 2.

The snap fastener, in accordance with the invention, may be either sewn or bonded to objects or, if they consist of thermoplastic material, may be heat sealed therewith. Furthermore, as shown in the following examples, each snap fastener member may be produced as an integral part of a handle or similar object.

FIGS. 3 and 4 show the filling end of a bag 10 which is provided with handle reinforcements 11 and 12. The bag may be a side folded tube length of material which is heat sealed and closed at the lower end thereby forming a bottom for the bag. The latter two features do not form a portion of the invention and have not been shown nor will they be described. The two bag walls 13 and 14 are provided in the vicinity of the upper end of the bag with an opening 15 which serves as the handle grip opening. The two handle reinforcement members 11 and 12 have integrally formed therein snap fasteners made in accordance with the invention. Each handle reinforcement possesses a head member 16 and a socket member 17. Of course, it is also possible for one handle reinforcement member to have a plurality of head members and the other handle reinforcement member to have an equal number of socket members.

Referring to FIG. 3, the handle reinforcement member 11 is provided at its right hand end with a socket member 17 and at its left-hand end with the head member 16. The socket member 17 is constructed in the same manner as the socket member of the snap fastener shown and previously described with reference to FIGS. 1 and 2. The recess 7 of socket member 17 receives the head portion 3 of the head member 16 of the handle reinforcement member 12. Corresponding to the head member shown in FIGS. 1 and 2, the head member 16 also has a diaphragm-like portion 4 which carries the head portion 3. In the region of the heads 3 or of the holes receiving them, the walls 13 and 14 of the bag are provided with openings. Assuming that the material of which the bag is made is a thermoplastic sheet, the handle reinforcements may be heat-sealed to the edges of the cutout portions of the bag walls 13 and 14.

Snap fasteners on handle reinforcements such as those described as members 11 and 12 may be applied to bag walls of a thermoplastic material by machine operation. Since the head portions 3 do not protrude with respect to the handle reinforcement members, they can readily be stacked so that they are easily separated by machine. Furthermore, the individual head members can be combined for further working in accordance with another embodiment to form tapes which may be rolled up. This was not possible heretofore with previously known snap fasteners.

FIG. 5 and FIG. 6 show the filling end of a bag 20 having a pair of carrying handles 21 and 22 extending from the end of the bag. The bag consists of a thermoplastic sheet and the handles are constructed of thermoplastic material. The two bag walls 23 and 24 have the edge of their filling openings sealed through connecting portions 25 and 26 respectively to the handle members 21 and 22 respectively. Like the handle reinforcement means 11 and 12 of the previously described embodiment, the carrying handles 21 and 22 also are each provided with a head member and a socket member 16 and 17, respectively. The diaphragm-like portion of the head member 16 is designated by 4, the head portion by 3, and the recess of the socket member by 7.

FIG. 7 shows a snap fastener 27, in accordance with the invention, a portion of which has been extended to form a suspension hook such as may be used for simultaneously closing and hanging the bag attached thereto. Depending upon the load of the bag in the bag 28, of which only a fragment has been shown in FIG. 7, either both members of the snap fastener 27 may have the hook-shaped projection 29 or only one of the members need be provided with a hook. In this embodiment the visible head portion is designated 3 and the visible recess of the socket member is designated 7. In the same manner as in the case of the embodiment of the bag of FIGS. 3 and 4, the walls of the bag 28 are cut out in the region of the head and the socket members, respectively.

A so-called rabbet-joint connection at the filling end of a bag 30 is shown in FIG. 8. The snap fastener 31 is shown with a socket member 32 provided in the upper wall and a head portion 33 of a contour corresponding to the socket member opening provided in the lower wall. The head portion 33 is shown elongated and is connected by a diaphragm-like portion with the edge portion of the head member. In order to receive the elongated head 33, the socket member 32 has a recess 34 which runs into a slot through which the elongated head is pushed.

FIG. 9 shows the head member of a snap fastener in accordance with the invention having two fixed positions for the head portion. In the manufacturing or processing position, the head 37 and the diaphragm-like portion 38 of the head member 36 are shown in solid lines and in the fastened position in broken lines. Since the diaphragm-like portion 38 is arched, it can lie only in one or the other position and not in an intermediate position. The transition portion between the edge portion and the diaphragm-like portion has a central plane to which the axis of the head portion is fixed perpendicularly. In this way the result is obtained that, by the nature of the attachment of the diaphragm to the edge portion, the diaphragm can be pressed neither into the one nor into the other relaxed position and therefore will always remain in one of the two positions in which it is placed upon manufactured or upon subsequent handling. This embodiment, as previously mentioned, has the advantage that the diaphragm-like portion in the fastening position exerts no, or at least substantially, no force upon the fastener connection on the head portion 37. Upon opening of a snap fastener connection between the socket member and the head member, the head does not spring directly back into its retracted position but enters such a position only when pressure is exerted on it in that direction. Furthermore, the reclosing of the snap fastening, in the case of this embodiment, is facilitated by the fact that the head, even in the unfastened condition, protrudes in previously customary manner beyond the surface of the edge portion which is to be brought against the socket portion and thus can easily be seen and gripped.

The uses of the snap fastener of the invention, which have been described, have been selected merely by way of example. Of course, the new inventive snap fastener can be used wherever snap fasteners have been heretofore employed and therefore it is deemed that the examples discussed are to be considered as merely illustrative and not all inclusive.

What is claimed is:

1. A snap fastener comprising a head member and a socket member, said head member being composed of resilient material and comprising an edge portion, a head portion, and a diaphragm-like portion connecting the base of said head portion to said edge portion, said diaphragm-like portion being of considerably smaller thickness than said edge portion and said head portion being of no greater height than the height of the edge portion, said diaphragm in the relaxed position holding the base of the head portion at a distance from the plane of the surface of the edge portion intended for application against the socket member which is equal at least to the height of said head portion, said socket member comprising an edge portion with an opening therein, said opening having a slightly small diameter than that of the largest portion of said head portion and being of substantially the same geometric shape.

2. A snap fastener according to claim 1 wherein the head portion of said head member is elongated and said opening in the socket portion is a corresponding elongated slot.

3. A snap fastener according to claim 1 wherein the diaphragm-like portion in the relaxed position is arched and the transition region from the edge portion to the diaphragm-like portion is approximately symmetrical to a plane to which the axis of the head portion is perpendicular.

4. A snap fastener according to claim 1 wherein the head and socket members of said fastener are made in combination with the respective coacting elements of a handle member adapted to be recessed in the walls of a bag adjacent the opening end thereof.

5. A snap fastener according to claim 1 wherein said head and socket members of said snap fastener are in combination, respectively, with a pair of handle members adapted to be attached to the opening end of a bag and extending therefrom.

6. A snap fastener according to claim 1 wherein the edge portion of at least the head member or socket member is extended and shaped into a hook.

References Cited

UNITED STATES PATENTS

| 1,770,879 | 7/1930 | Donchian | 24—217 |
| 1,826,976 | 10/1931 | Wright | 150—1.7 |
| 2,347,863 | 5/1944 | Woodward | 24—216 |

FOREIGN PATENTS

| 58,646 | 4/1913 | Austria. |
| 872,204 | 2/1942 | France. |
| 1,296,741 | 5/1962 | France. |
| 288,368 | 10/1915 | Germany. |

BOBBY R. GAY, *Primary Examiner.*

ERNEST SIMONSEN, *Assistant Examiner.*